United States Patent
Furusawa

(10) Patent No.: US 10,160,266 B2
(45) Date of Patent: Dec. 25, 2018

(54) PNEUMATIC TIRE

(71) Applicant: The Yokohama Rubber Co., LTD., Minato-ku, Tokyo (JP)

(72) Inventor: Hiroshi Furusawa, Hiratsuka (JP)

(73) Assignee: The Yokohama Rubber Co., LTD. (JP)

( * ) Notice: Subject to any disclaimer, the term of this patent is extended or adjusted under 35 U.S.C. 154(b) by 479 days.

(21) Appl. No.: 14/784,567

(22) PCT Filed: Apr. 9, 2014

(86) PCT No.: PCT/JP2014/060313
§ 371 (c)(1),
(2) Date: Oct. 14, 2015

(87) PCT Pub. No.: WO2014/171379
PCT Pub. Date: Oct. 23, 2014

(65) Prior Publication Data
US 2016/0068024 A1  Mar. 10, 2016

(30) Foreign Application Priority Data
Apr. 17, 2013  (JP) .................. 2013-086685

(51) Int. Cl.
*B60C 11/11* (2006.01)
*B60C 11/12* (2006.01)
*B60C 11/03* (2006.01)

(52) U.S. Cl.
CPC ...... *B60C 11/0306* (2013.01); *B60C 11/0327* (2013.01); *B60C 11/11* (2013.01);
(Continued)

(58) Field of Classification Search
CPC . B60C 11/11; B60C 11/0306; B60C 11/0302; B60C 2011/036; B60C 2011/0348; B60C 2011/1245
See application file for complete search history.

(56) References Cited

U.S. PATENT DOCUMENTS 5,204,036 A  *  4/1993  MacMillan ........ B29D 30/0606
156/95
2011/0208488 A1  8/2011  Sakuraba
(Continued)

FOREIGN PATENT DOCUMENTS

CN  102159408  8/2011
CN  102458884  5/2012
(Continued)

OTHER PUBLICATIONS

Machine translation for Japan 2011-168220 (Year: 2018).*
(Continued)

*Primary Examiner* — Steven D Maki
(74) *Attorney, Agent, or Firm* — Thorpe North & Western

(57) ABSTRACT

The present technology relates to a pneumatic tire in which a plurality of small blocks is delineated and formed by a plurality of rectilinear circumferential narrow grooves and a plurality of widthwise narrow grooves that communicate with the circumferential narrow grooves, and small block rows with the small blocks aligned along a tire circumferential direction are formed between adjacent circumferential narrow grooves. Each of the small blocks has a surface area differing from that of at least one small block that belongs to an adjacent small block row on at least one side with respect to a tire width direction and has an overlapping tire circumferential directional region. The small blocks have surface areas of no less than 20 mm$^2$ and no more than 400 mm$^2$.

15 Claims, 8 Drawing Sheets

(52) U.S. Cl.
CPC ..... *B60C 11/0302* (2013.01); *B60C 2011/036* (2013.01); *B60C 2011/0348* (2013.01); *B60C 2011/0358* (2013.01); *B60C 2011/0374* (2013.01); *B60C 2011/1213* (2013.01); *B60C 2011/1245* (2013.01)

(56) References Cited

U.S. PATENT DOCUMENTS

| | | | |
|---|---|---|---|
| 2012/0037289 A1* | 2/2012 | Ochi | B60C 11/11 152/209.18 |
| 2012/0080129 A1 | 4/2012 | Furusawa | |
| 2012/0125501 A1 | 5/2012 | Ochi et al. | |
| 2013/0000805 A1* | 1/2013 | Oodaira | B60C 11/11 152/209.18 |
| 2013/0133798 A1 | 5/2013 | Ochi | |

FOREIGN PATENT DOCUMENTS

| | | | |
|---|---|---|---|
| EP | 114594 A2 * | 8/1984 | |
| JP | 63-159110 A * | 7/1988 | |
| JP | 03-010913 A * | 1/1991 | |
| JP | H03-010913 | 1/1991 | |
| JP | 03-186403 A * | 8/1991 | |
| JP | 08-318710 A * | 3/1996 | |
| JP | H08-0324211 | 12/1996 | |
| JP | 2002-293111 A * | 10/2002 | |
| JP | 2003-054222 | 2/2003 | |
| JP | 2005-170187 | 6/2005 | |
| JP | 3690836 | 8/2005 | |
| JP | 2006-051863 A * | 2/2006 | |
| JP | 2009-061796 | 3/2009 | |
| JP | 2009-061797 | 3/2009 | |
| JP | 2009-241626 | 10/2009 | |
| JP | 2010-269769 | 12/2010 | |
| JP | 2010-285040 | 12/2010 | |
| JP | 2011-025864 | 2/2011 | |
| JP | 2011-143901 | 7/2011 | |
| JP | 2011-168220 | 9/2011 | |
| JP | 2011-168220 A * | 9/2011 | |
| JP | 2012-041019 | 3/2012 | |
| JP | 2012-076659 | 4/2012 | |
| JP | 2012-180068 | 9/2012 | |
| WO | WO 2010/032736 | 3/2010 | |
| WO | WO 2010/137273 | 12/2010 | |
| WO | WO 2011/111394 | 9/2011 | |
| WO | WO 2012/018081 | 2/2012 | |

OTHER PUBLICATIONS

Machine translation for Japan 2006-051863 (Year: 2018).*
Machine translation for Japan 2002-293111 (Year: 2018).*
Machine translation for Japan 08-318710 (Year: 2018).*
Machine translation for Japan 03-186403 (Year: 2018).*
Machine translation for Japan 03-010913 (Year: 2018).*
Translation for Japan 63-159110 (Year: 2018).*
Machine translation for Europe 114594 (Year: 2018).*
International Search Report for International Application No. PCT/JP2014/060313 dated Jun. 17, 2014, 5 pages, Japan.

* cited by examiner

PNEUMATIC TIRE

TECHNICAL FIELD

The present technology relates to a pneumatic tire, and specifically to a studless tire offering improved performance on ice and snow.

BACKGROUND

Multiple sipes and narrow grooves are often provided in the tread portion of a studless tire in order to improve braking performance on ice, especially at higher temperatures, i.e., near 0° C. (see, for example, Japanese Patent No. 3690836).

However, as disclosed in Japanese Patent No. 3690836, providing multiple sipes and narrow grooves in the tread portion divides the tread portion into multiple small sections, thereby potentially reducing the rigidity of the tread portion. This leads to the problem of difficulty in maintaining steering stability on snow, a type of performance that calls for high rigidity on the part of the tread portion.

SUMMARY

The present technology provides a pneumatic tire that allows for both improved braking performance on ice and improved steering stability on snow.

In accordance with the present technology, provided is:

a pneumatic tire comprising a plurality of small blocks delineated and formed by a plurality of rectilinear circumferential narrow grooves and a plurality of widthwise narrow grooves that communicate with the circumferential narrow grooves; and small block rows with the small blocks aligned along a tire circumferential direction formed between adjacent circumferential narrow grooves, each of the small blocks having a surface area differing from that of at least one small block that belongs to an adjacent small block row on at least one side with respect to a tire width direction and has an overlapping tire circumferential directional region; and the surface area of each of the small blocks being no less than 20 mm$^2$ and no more than 400 mm$^2$.

In accordance with the pneumatic tire according to the present technology, it is possible to improve both braking performance on ice and steering stability on snow.

DETAILED DESCRIPTION (First Embodiment)

Figure 1:
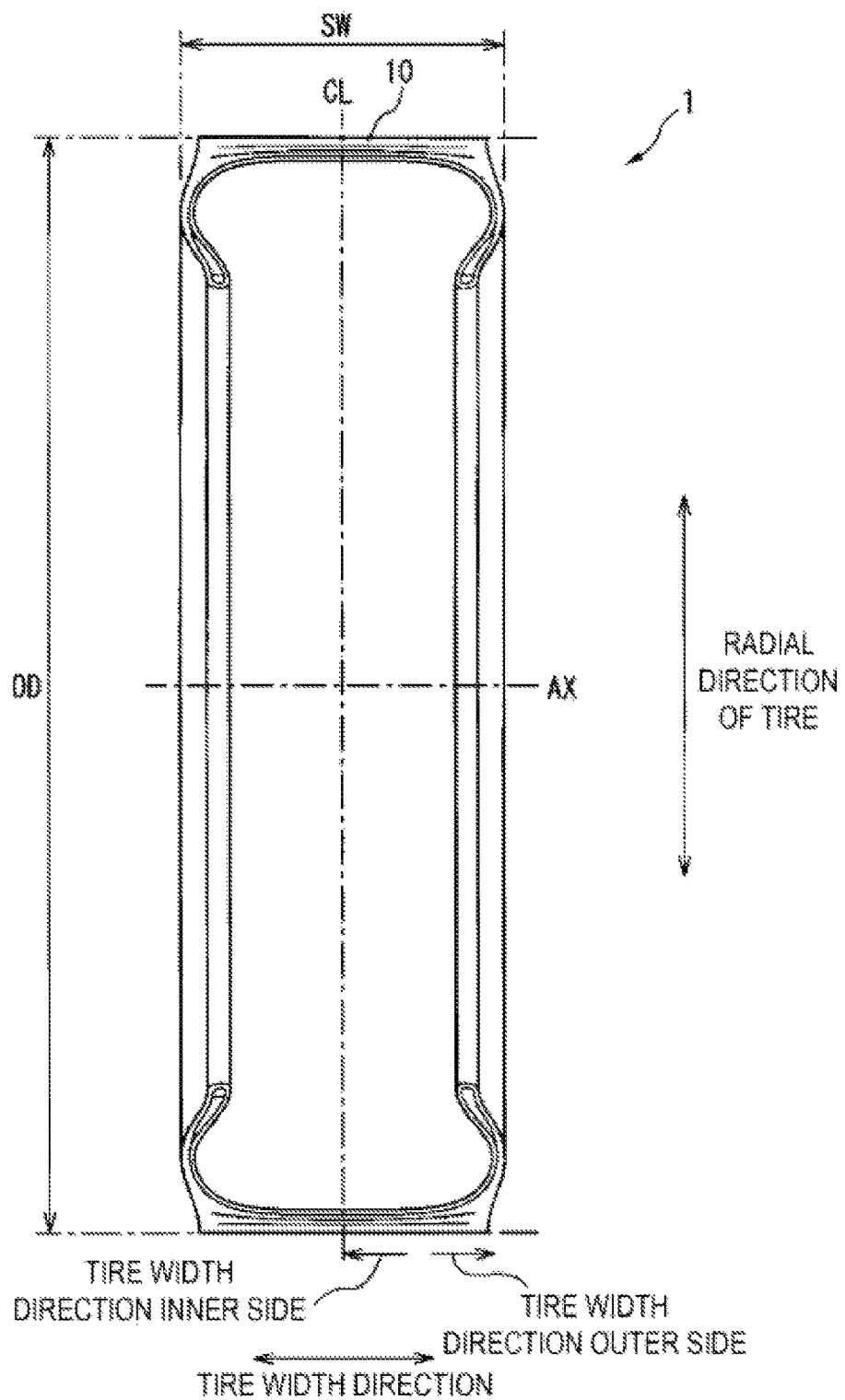
FIG. 1 is a meridian cross-sectional view of a pneumatic tire according to a first embodiment of the present technology.

A pneumatic tire 1 according to a first embodiment of the present technology will now be described with reference to the drawings. FIG. 1 is a meridian cross-sectional view of a pneumatic tire 1 according to a first embodiment of the present technology. The pneumatic tire 1 according to the first embodiment has a meridian cross-sectional shape similar to that of a conventional pneumatic tire. Here, the meridian cross-sectional shape of the pneumatic tire refers to the cross-sectional shape of the pneumatic tire as it appears on a plane normal to the tire equatorial plane CL.

In the following description, the term "tire radial direction" refers to a direction orthogonal to the rotational axis AX of the pneumatic tire 1. The term "tire circumferential direction" refers to the direction of rotation around the rotational axis AX (see FIG. 2). The term "tire width direction" refers to a direction parallel to the rotational axis AX, the term "inner side in the tire width direction" refers to a side in a direction along the tire width direction facing a tire equatorial plane (tire equator line), and "outer side in the tire width direction" refers to a side in a direction along the tire width direction away from the tire equatorial plane CL. "Tire equatorial plane CL" refers to a plane that is orthogonal to the rotational axis AX of the pneumatic tire 1 and that passes through the center of the width of the pneumatic tire 1. "Tire equator line" refers to a line along the tire circumferential direction of the pneumatic tire 1 that lies on the tire equatorial plane CL. In the present specification and drawings, the tire equator line is labeled identically to the tire equatorial plane as "CL".

Figure 2:
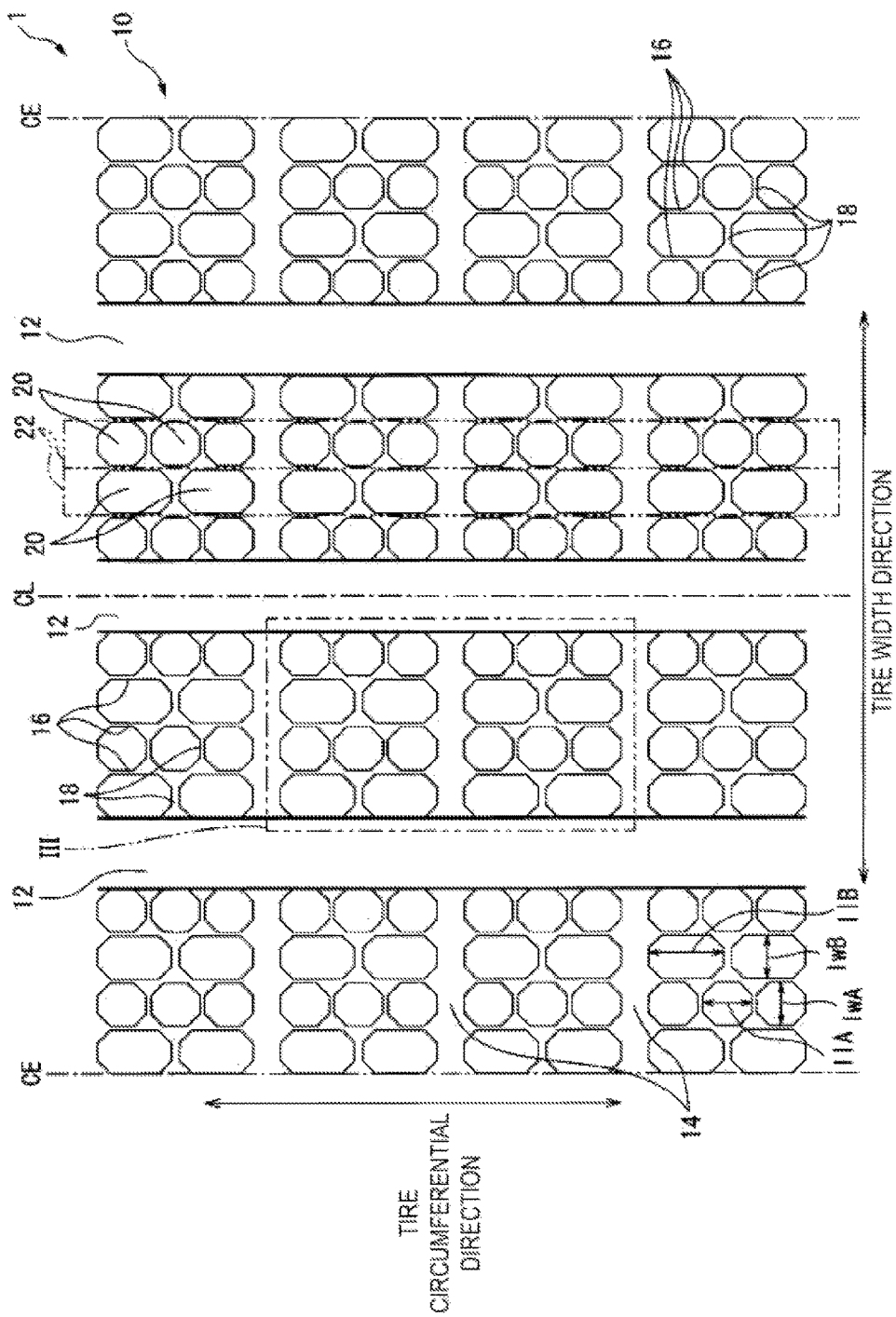
FIG. 2 is a flat development view of part of a tread portion of the pneumatic tire according to the first embodiment of the present technology.

FIG. 2 is a flat development view of part of a tread portion 10 of the pneumatic tire 1 according to the first embodiment of the present technology. As illustrated in FIG. 2, multiple (in the case of FIG. 2, three) circumferential main grooves 12 extending in the tire circumferential direction are provided in the tread portion 10 of the pneumatic tire 1 according to the first embodiment. In the land portions delineated by the circumferential main grooves 12 are provided a plurality of lug grooves 14 extending in a direction (in FIG. 2, in the tire width direction) not parallel to the tire circumferential direction, a plurality of circumferential narrow grooves 16 that are narrower than the circumferential main grooves 12 and extend rectilinearly in the annular tire circumferential direction, and a plurality of widthwise narrow grooves 18 that are, for example, narrower than the lug grooves 14, allows the circumferential narrow grooves 16 to communicate with each other, and terminate at the circumferential narrow grooves 16 that communicate thereby. As a result, small block rows 22 with small blocks 20 aligned in the tire circumferential direction are formed between adjacent circumferential narrow grooves 16. The both ends of the small block rows 22 with respect to the tire width direction are defined by the circumferential main grooves 12 and/or the circumferential narrow grooves 16.

The circumferential narrow grooves 16 and the widthwise narrow grooves 18 are incised grooves having groove widths of no less than 1 mm and no more than 2 mm. In this context, "groove width" refers to the dimensions of the groove as measured in a direction perpendicular to the direction in which the groove extends.

In the first embodiment, as illustrated in FIG. 2, each of the small blocks 20 has an octagonal shape as seen in plan view. In other words, each of the small blocks 20 has a shape formed by chamfering the corners of the rectangular shape delineated and formed by the circumferential main grooves 12, the circumferential narrow grooves 16, and the widthwise narrow grooves 18. However, the small blocks 20 are not limited to having an octagonal shape as seen in plan view, and may also be simple rectangles, polygons other than octagons, or circles.

In the present specification, in cases in which there are circumferential broad grooves (equivalent to the circumferential main grooves 12 in the first embodiment) that have greater groove widths than the circumferential narrow grooves 16 and extend substantially in the tire circumferential direction, the land portions delineated and formed by the circumferential broad grooves are considered ribs. In the present specification, in cases in which there are further widthwise broad grooves (equivalent to the lug grooves 14 in the first embodiment) that have greater groove widths than the widthwise narrow grooves 18, extend in a direction that is oblique with respect to the tire circumferential direction, and communicate with the circumferential main grooves 12, the land portions delineated and formed between the circumferential broad grooves and between the widthwise broad grooves are considered blocks.

Figure 3:
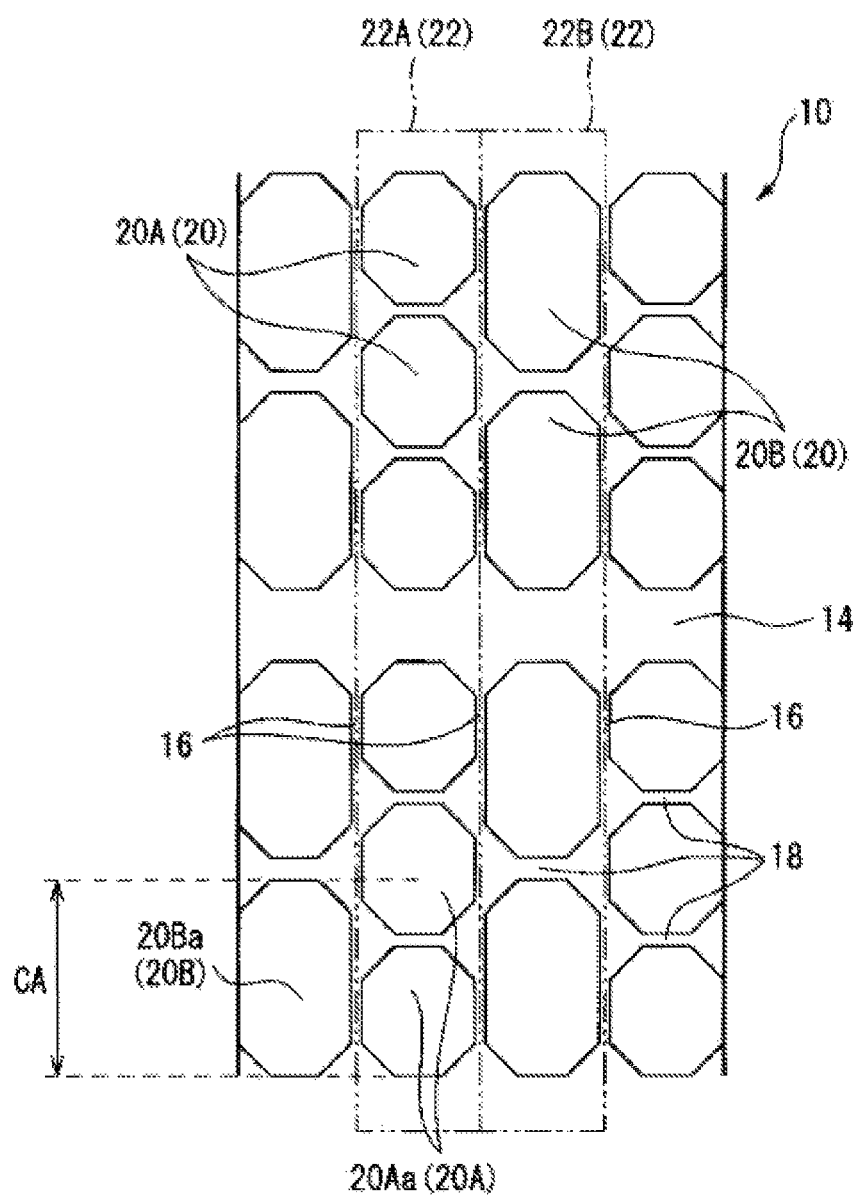
FIG. 3 is a magnified view of the section labeled III in FIG. 2.

FIG. 3 is a magnified view of the section labeled III in FIG. 2. Two types of small blocks 20 are depicted in FIG. 3. Specifically, as illustrated in FIG. 3, the small blocks 20 comprise short small blocks 20A having shorter dimensions with respect to the tire circumferential direction and long small blocks 20B having longer dimensions with respect to the tire circumferential direction. The short small blocks 20A are provided along the entire circumference of the pneumatic tire 1, thereby forming short small block rows 22A. The long small blocks 20B are also provided along the entire circumference of the pneumatic tire 1, thereby forming long small block rows 22B. In the example illustrated in FIGS. 2 and 3, the spacing between the circumferential narrow grooves 16 is constant, with the result that the small blocks included in each of the small block rows 22 (e.g., rows 22A, 22B) all have uniform dimensions with respect to the tire width direction.

As illustrated in FIG. 3, the short small block rows 22A and the long small block rows 22B are formed adjacent to each other in the tire width direction on opposite sides of the circumferential narrow grooves 16. The small blocks 20A, 20B included in the small block rows 22A, 22B have surface areas different from those of the small blocks 20B, 20A included in adjacent small block rows 22B, 22A with respect to the tire width direction and having overlapping tire circumferential directional regions CA.

The "tire circumferential directional regions CA" referred to here are the regions from one end to the other of the small blocks 20 of interest (here, any long small block 20Ba selected for the sake of illustration) with respect to the tire circumferential direction. As an example, the tire circumferential directional region CA of the long small block 20Ba is illustrated by dotted lines in FIG. 3. In the present technology, in cases in which there are, for the small block 20Ba of interest, multiple small blocks 20Aa that belong to an adjacent small block row 22A with respect to the tire width direction and have overlapping tire circumferential directional regions CA, as illustrated in FIG. 3, it is sufficient for at least one of the small blocks 20Aa to have a surface area that is different from that of the small blocks 20Ba.

Each of the small blocks 20 has a surface area of no less than 20 mm$^2$ and no more than 400 mm$^2$. In the context of the present technology, the "surface area" of the small blocks 20 is the area of the outer surfaces of the small blocks 20.

The effects of the pneumatic tire according to the first embodiment will now be described.

(1) A large number of narrow grooves called sipes are generally provided in the tread surface of studless tires in order to improve braking performance on ice at high temperatures (near 0° C.). This is because braking force is yielded by channeling away water on the surface of the ice with the sipes and bringing the tread surface into ground contact with the surface of the ice. In the pneumatic tire 1 according to the first embodiment, short small blocks 20A having small surface areas, i.e., small dimensions with respect to the tire circumferential direction, are provided in the short small block rows 22A. Thus, numerous widthwise narrow grooves 18 are provided in the short small block rows 22A, thereby improving braking performance on ice.

(2) However, the small surface area, i.e., small dimensions with respect to the tire circumferential direction, of the short small blocks 20A leads to reduced block rigidity, potentially inhibiting the demonstration of sufficient steering stability on snow, which calls for a high level of block rigidity. In order to improve block rigidity, the first embodiment is provided with long small block rows 22B made up of long small blocks 20B having tire circumferential directional dimensions greater than those of the short small blocks 20A adjacent to the short small block rows 22A. As a result, even if incoming force is applied to the tread portion 10 in the tire width direction, causing deformation of the short small blocks 20A in the tire width direction, the long small blocks 20B, which are less prone to deformation because they are more rigid than the short small blocks 20A, are capable of supporting the deformed short small blocks 20A, allowing the tread portion 10 as a whole to demonstrate a high level of rigidity with respect to the tire width direction. Thus, the pneumatic tire 1 according to the first embodiment is capable of maintaining or improving stability on snow.

(3) As discussed above, the small blocks 20 have surface areas of no less than 20 mm$^2$ and no more than 400 mm$^2$. This allows for a balance between braking performance on ice and steering stability on snow. Imparting the small blocks 20 with surface areas of no less than 20 mm$^2$ ensures sufficient block rigidity on the part of the small blocks 20, allowing for improved steering stability on snow. Imparting the small blocks 20 with surface areas of no more than 400 mm$^2$ ensures a sufficient number of narrow grooves 16, 18, allowing for improved braking performance on ice.

(4) The provision of small blocks 20A, 20B having different dimensions with respect to the tire circumferential direction allows for the dispersal of the frequency peaks of high-frequency pattern noise caused by the circumferential narrow grooves 16 and the widthwise narrow grooves 18, thereby allowing for improved noise performance.

(5) The pneumatic tire 1 according to the first embodiment is preferably provided with lug grooves 14 that have greater groove widths than the circumferential narrow grooves 16 and the widthwise narrow grooves 18 and communicate with the circumferential main grooves 12. This is because snow on the road surface can be more efficiently removed due to the sufficient groove width of the lug grooves 14, thereby allowing for further improvement in steering stability on snow. Note, in the first embodiment, the lug grooves 14 are optional elements that may be omitted. In other words, the tread pattern of the pneumatic tire according to the present technology may be a rib pattern formed by the circumferential main grooves 12, the circumferential narrow grooves 16, and the widthwise narrow grooves 18. In the first embodiment, the circumferential main grooves 12 are also optional elements that may be omitted. In other words, the tread pattern of the pneumatic tire according to the present technology may be a tread pattern formed by the circumferential narrow grooves 16 and the widthwise narrow grooves 18.

Although the entirety of the pneumatic tire 1 according to the first embodiment is not illustrated in the drawing, 180 short small blocks 20A are formed in the short small block rows 22A around the entire circumference of the tire in the tire circumferential direction, and 120 long small blocks 20B are formed in the long small block rows 22B in the tire circumferential direction. The pneumatic tire 1 according to the first embodiment is provided with a number of lug grooves 14 aligned in the tire circumferential direction equal to a common factor of the number of small blocks 20A and the number of 20B in each of the small block rows 22A, 22B. Specifically, this common factor is sixty in the first embodiment; thus, sixty lug grooves 14 are provided per one rib so as to set off groups of three (180/60=3) short small blocks 20A apiece and two (120/60=2) long small blocks apiece. As a result, the lug grooves 14 do not cut across the small blocks 20. The first embodiment is not limited to the number 60; any common factor of the numbers of small blocks 20 in single small block rows 22, i.e., 120 and 180, may be selected, such as 30 or 15.

Figure 5:
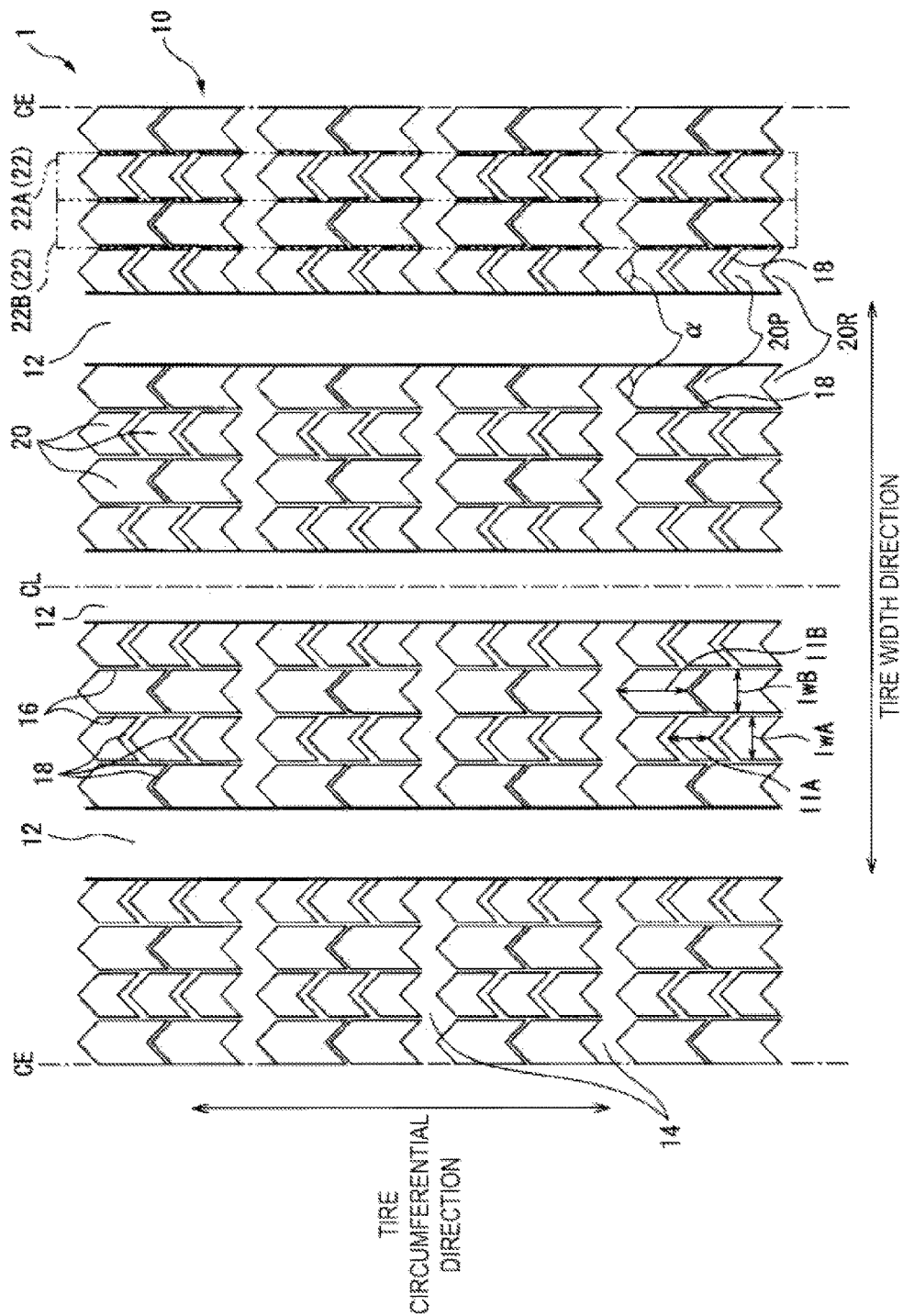
FIG. 5 is a flat development view of part of a tread portion of the pneumatic tire according to a third embodiment of the present technology.

The small blocks 20 preferably have dimensions with respect to the tire width direction of no less than 5 mm and no more than 15 mm. Imparting the small blocks 20 with dimensions with respect to the tire width direction of no less than 5 mm ensures sufficient rigidity in the tire width direction on the part of the small blocks 20, thereby allowing for further improvements in steering stability on snow. Imparting the small blocks 20 with dimensions with respect to the tire width direction of no more than 15 mm ensures a sufficient number of edges on the tread portion 10 as a whole, thereby allowing for the effective removal of water of ice surfaces and, by extension, improved performance on ice. The term "dimensions with respect to the tire width direction" of the small blocks 20 refers to the maximum measured dimensions of the small blocks 20 with respect to the tire width direction. For example, as illustrated in FIGS. 2 and 5 which is described later, in which the dimensions of the short small blocks 20A with respect to the tire width direction are labeled IwA and the dimensions of the long small blocks 20B with respect to the tire width direction are labeled IwB.

The small blocks 20 preferably have dimensions with respect to the tire circumferential direction of no less than 5 mm and no more than 15 mm. This is because imparting the small blocks 20 with dimensions with respect to the tire circumferential direction of no less than 5 mm yields high rigidity in the tire circumferential direction on the part of the small blocks 20, thereby hardly collapsing the small blocks 20 during braking, ensuring sufficient ground contact area, and allowing for superior braking performance on ice. Imparting the small blocks 20 with dimensions with respect to the tire circumferential direction of no more than 15 mm allows for the provision of numerous widthwise narrow grooves 18, enabling improved braking performance on ice. The term "dimensions with respect to the tire circumferential direction" of the small blocks 20 refers to the maximum measured dimensions of the small blocks 20 with respect to the tire circumferential direction. For example, as illustrated in FIGS. 2 and 5 which are described later, the dimensions of the short small blocks 20A with respect to the tire circumferential direction are labeled HA and the dimensions of the long small blocks 20B with respect to the tire circumferential direction are labeled IIB.

In the pneumatic tire 1 according to the first embodiment, the lug grooves 14 are provided so as to allow the circumferential main grooves 12 to communicate with each other, or the circumferential main grooves 12 with ground contact edges CE. However, the lug grooves 14 need only communicate with the circumferential main grooves 12 and/or the ground contact edges CE. In the present technology, the term "ground contact edges CE" refers to the tire widthwise directional ends of the contact patch when the pneumatic tire is mounted on a regular rim, inflated to a regular internal pressure, and placed into contact with a flat surface under a standard load (such as 80% of the load index (LI)). In this context, the term "regular rim" refers to a "standard rim" as defined by the Japan Automobile Tyre Manufacturers Association Inc. (JATMA), a "design rim" as defined by the Tire and Rim Association, Inc. (TRA), or a "measuring rim" as defined by the European Tyre and Rim Technical Organisation (ETRTO). The term "regular internal pressure" refers to "maximum air pressure" as defined by JATMA, a maximum value in "tire load limits at various cold inflation pressures" as defined by TRA, or "inflation pressures" as defined by ETRTO.

In the first embodiment, the small blocks 20 in a single small block row 22 have constant dimensions with respect to the tire circumferential direction (i.e., constant surface areas); however, it is also acceptable for a mixture of small blocks 20 of different dimensions with respect to the tire circumferential direction (different surface areas) to be present in a single small block row 22.

The pneumatic tire 1 according to the first embodiment has a tread pattern in which small blocks 20 are formed over the entirety of the tread portion 10. However, it is sufficient for the pneumatic tire according to the present technology to comprise at least two small block rows 22 delineated and formed by the circumferential narrow grooves 16 and the widthwise narrow grooves 18, the small blocks 20 of one of the small block rows 22 having surface areas different from that of at least one small block 20 that belongs to an adjacent small block row 22 on at least one side with respect to the tire width direction and has an overlapping tire circumferential directional region CA. Providing a plurality of widthwise narrow grooves 18 improves braking performance on ice, and the presence of small blocks 20 having overlapping tire circumferential directional regions allows the small blocks 20 having greater dimensions with respect to the tire circumferential direction (i.e., greater surface areas) to support the small blocks 20 having smaller dimensions with respect to the tire circumferential direction (i.e., smaller surface areas). Thus, the pneumatic tire 1 according to the first embodiment allows for improved steering stability on snow.

In the first embodiment, there are only two types of small blocks 20 having different dimensions with respect to the tire circumferential direction, namely, the short small blocks 20A and the long small blocks 20B; however, it is also possible for there to be no less than three types of blocks as long as small blocks 20 with overlapping tire circumferential directional regions have different lengths with respect to the tire circumferential direction.

(Second Embodiment)

Figure 4:
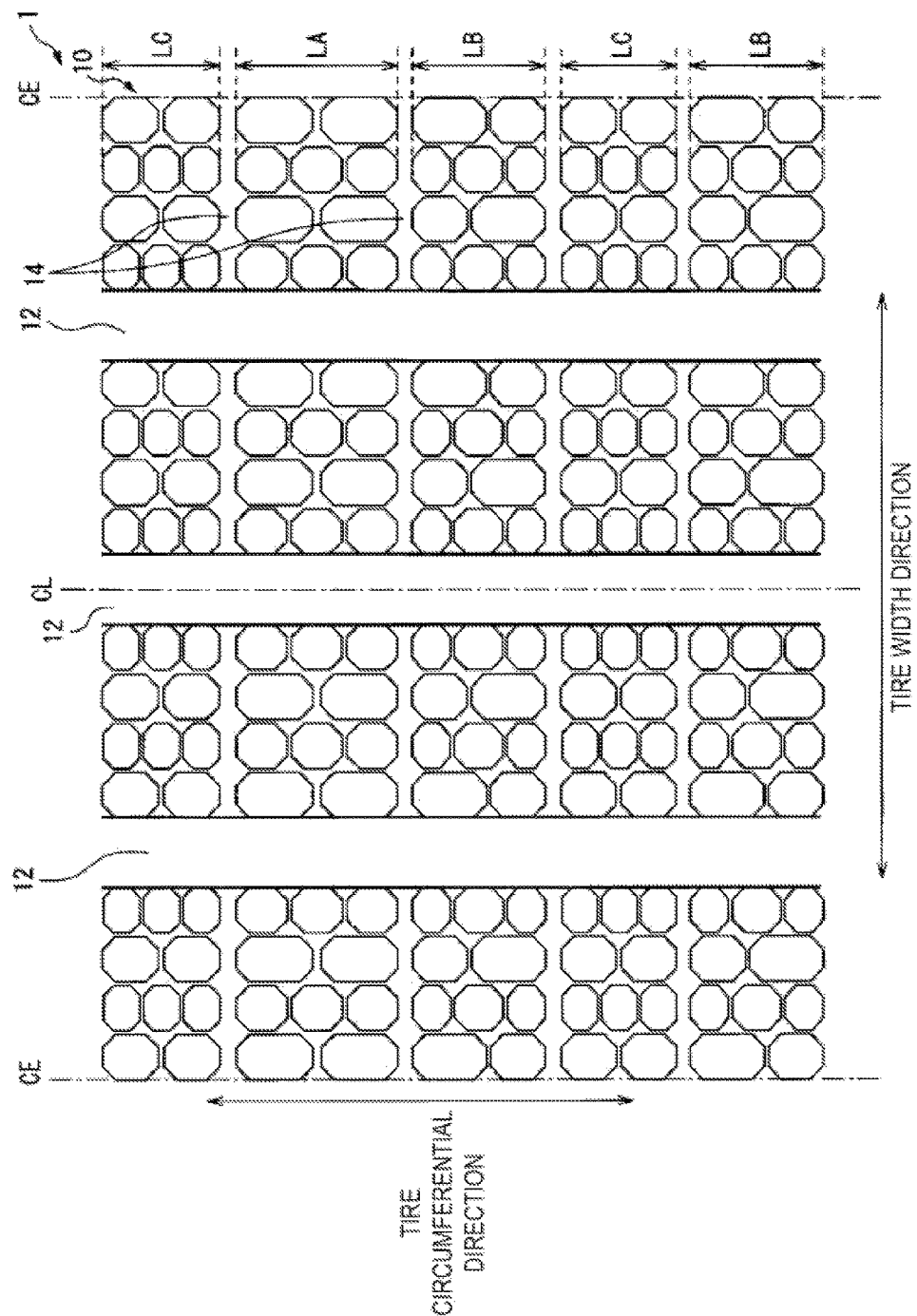
FIG. 4 is a flat development view of part of a tread portion of the pneumatic tire according to a second embodiment of the present technology.

A pneumatic tire 1 according to a second embodiment of the present technology will now be described with reference to FIG. 4. FIG. 4 is a flat development view of part of a tread portion 10 of the pneumatic tire 1 according to the second embodiment of the present technology. Only the differences from the first embodiment will be described.

As illustrated in FIG. 4, the pneumatic tire 1 according to the second embodiment, like the pneumatic tire 1 according to the first embodiment, is provided with lug grooves 14 that allow the circumferential main grooves 12 to communicate with each other, or the circumferential main grooves 12 with the ground contact edges CE. In the pneumatic tire 1 according to the first embodiment, the distance between adjacent lug grooves 14 with respect to the tire circumferential direction is constant. In the pneumatic tire 1 according to the second embodiment, by contrast, there are three such distances: LA, LB, LC (LA>LB>LC). The second embodiment differs from the first embodiment with respect to this point. In other words, the pneumatic tire 1 according to the second embodiment has a tread pattern exhibiting pitch variations.

In this context, the term "distance between adjacent lug grooves 14 with respect to the tire circumferential direction" refers to the distance between the boundary lines of the land portions on the facing sides of adjacent lug grooves 14 with respect to the tire circumferential direction. In the second embodiment, this distance is equivalent to the dimensions with respect to the tire circumferential direction of the blocks formed between the lug grooves 14. If adjacent lug grooves 14 with respect to the tire circumferential direction do not extend in parallel each other, the term "distance between adjacent lug grooves 14 with respect to the tire circumferential direction" refers to the distance with respect to the tire circumferential direction between center points of the boundary lines with respect to the tire circumferential direction.

In the second embodiment, as illustrated in FIG. 4, the admixture of small blocks 20 having different dimensions with respect to the tire circumferential direction, like the blocks having dimensions LB with respect to the tire circumferential direction, in a single small block row 22 alters the distance between adjacent lug grooves 14 with respect to the tire circumferential direction. The distance between adjacent lug grooves 14 with respect to the tire circumferential direction is also altered by altering the dimensions of the small blocks 20 with respect to the tire circumferential direction, as in the case of the blocks having dimensions LA and LC with respect to the tire circumferential direction. However, despite these alterations in the distance between adjacent lug grooves 14 with respect to the tire circumferential direction, there is no change in the fact that there is a number of lug grooves 14 aligned in the tire circumferential direction equal to a common factor of the numbers of small blocks 20 in the small block rows 22.

The provision of lug grooves 14 as described above in the pneumatic tire 1 according to the second embodiment makes it possible to prevent the pattern noise produced by the lug grooves 14 from concentrating at a specific frequency. Thus, by extension, the pneumatic tire 1 according to the second embodiment enables improved noise performance.

In the second embodiment, as illustrated in FIG. 4, there are three types of distance between adjacent lug grooves 14 with respect to the tire circumferential direction, but it is sufficient for there to be no less than two such distances. This allows for the dispersion of the frequency of the pattern noise produced by the lug grooves 14.

(Third Embodiment)

A pneumatic tire 1 according to a third embodiment of the present technology will now be described with reference to FIG. 5. FIG. 5 is a flat development view of part of a tread portion 10 of the pneumatic tire 1 according to the third embodiment of the present technology. Only the differences from the first embodiment will be described. The pneumatic tire 1 according to the third embodiment differs from the pneumatic tire 1 according to the first embodiment in that the small blocks 20 have arrow fletch shape pointing in the tire circumferential direction.

In the pneumatic tire 1 according to the third embodiment, as illustrated in FIG. 5, the small blocks 20 comprise convex sections 20P that are convex towards the adjacent small block in the tire circumferential direction on one side with respect to the tire circumferential direction, and concave sections 20R that are concave towards the adjacent small block in the tire circumferential direction on another side with respect to the tire circumferential direction. The convex sections 20P and concave sections 20R of adjacent small blocks 20 with respect to the tire circumferential direction are fitted together via the widthwise narrow grooves 18.

In the third embodiment, the arrangement of the small blocks 20 as described above allows not only adjacent small blocks 20 with respect to the tire width direction, but also adjacent small blocks 20 with respect to the tire circumferential direction, to support each other via the parts thereof that overlap in the tire circumferential direction when the small blocks 20 deform in the tire width direction. Thus, the pneumatic tire 1 according to the third embodiment advantageously offers improved rigidity of the tread portion 10 as a whole with respect to the tire width direction, and, by extension, improved steering stability on snow.

As illustrated in FIG. 5, the small blocks 20 have arrow fletch shapes. In addition, it is preferable that the tips of the arrow fletch shapes constituted by the convex sections 20P of the third embodiment have a bend angle a of no less than 40° and no more than 170°. Imparting a bend angle a of no less than 40° keeps the tips of the arrow fletch shapes from having a tapered shape, and, by extension, shortens the widthwise narrow grooves 18, with the result that water on icy road surfaces and snow on snowy road surfaces does not pool in the widthwise narrow grooves 18, but is easily ejected from the widthwise narrow grooves 18. As a result, water drainage performance and snow discharge performance are improved, by extension allowing for improved braking performance on ice and steering stability on snow. Imparting a bend angle a of no more than 170° ensures a suitable amount of overlap in the tire circumferential direction between the convex sections 20P and the concave sections 20R, allowing adjacent small blocks 20 with respect to the tire circumferential direction to sufficiently support each other in the tire width direction. As a result, improved steering stability on snow is possible. In addition, the convex sections 20P and the concave sections 20R are fitted together via the widthwise narrow grooves 18; thus, the bend angles of the rear ends of the arrow fletch shapes constituted by the concave sections 20R of the third embodiment are substantially identical to the bend angles a of the tips of the arrow fletch shapes.

As discussed above, the convex sections 20P and concave sections 20R of the small blocks 20 comprise bent sections. As a result, the small blocks 20 exhibit high bending rigidity (secondary cross-sectional moment) in the tire circumferential direction, hardly collapsing the small blocks 20 in the tire circumferential direction. This allows for ensured ground contact area, and enables improved braking performance on ice.

As discussed above, the pneumatic tire according to the third embodiment allows for improved braking performance on ice and steering stability on snow. However, the effects described above will be demonstrated as long as the small blocks 20 have convex sections 20P on one side thereof with respect to the tire circumferential direction that project toward the adjacent small blocks in the tire circumferential direction and concave sections 20R on the other side thereof with respect to the tire circumferential direction that recess inward toward the adjacent small blocks in the tire circumferential direction, the convex sections 20P and the concave sections 20R of adjacent small blocks 20 being fitted together via the widthwise narrow grooves 18; thus, the small blocks 20 are not limited to having an arrow fletch shape.

Figure 6A:
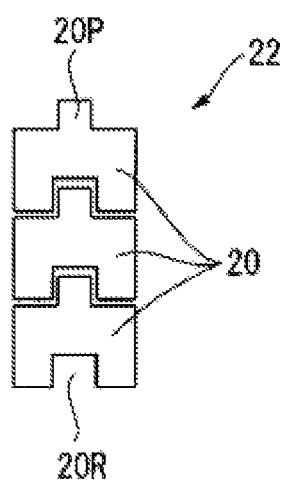
FIG. 6A is a line drawing of the shape of small blocks of a pneumatic tire according to a modified example of the third embodiment of the present technology.
Figure 6B:
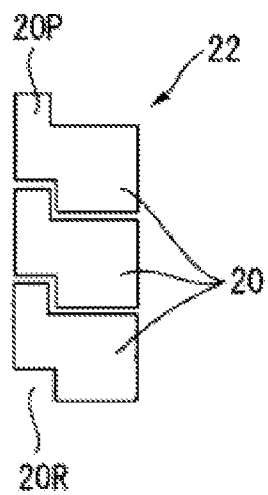
FIG. 6B is a line drawing of the shape of small blocks of a pneumatic tire according to a modified example of the third embodiment of the present technology.

FIGS. 6A and 6B are line drawings illustrating the shapes of small blocks 20 of pneumatic tires according to modified examples of the third embodiment as examples of shapes for the small blocks 20 other than arrow fletch shapes. Imparting the small blocks 20 with shapes such as those illustrated in FIG. 6A or 6B will allow for superior braking performance on ice and steering stability on snow, as in the pneumatic tire according to the third embodiment.

In FIGS. 5, 6A, and 6B, the convex sections 20P and the concave sections 20R have triangular or rectangular shapes, but these sections are not especially limited to having such shapes, and may have any shape, such as semicircular or another type of polygon, as long as allowing adjacent small blocks in the tire circumferential direction via the widthwise narrow grooves 18 to support each other.

The pneumatic tires according to the third embodiment and the modified examples thereof may also be provided with pitch variations, as in the case of the pneumatic tire according to the second embodiment. In other words, no less than two types of distance between adjacent lug grooves 14 with respect to the tire circumferential direction may be present in the pneumatic tires according to the third embodiment and the modified examples thereof.

EXAMPLES

In the present embodiment, pneumatic tires exhibiting various conditions were subjected to vehicle tests of braking performance on ice and steering stability on snow. Test tires according to a conventional example and first through sixth working examples of the present embodiment have a tire size of 195/65 R15. These vehicle tests were performed by installing the test tires on a 15×6JJ size rim, filling the tires to an internal pressure of 210 kPa, and mounting the tires on an 1,800 cc engine displacement front wheel drive vehicle.

The methods used to execute performance testing on the tires will now be described.
(Braking Performance on Ice)

A braking test was performed from an initial speed of 40 km/h until complete stoppage on a test course having a frozen road surface at a road surface temperature of −3 to 0° C. The reciprocals of the braking distances thus obtained were indicated as index values against a value of 100 for the conventional example. A larger index value indicates shorter braking distance and superior braking performance on ice.
(Steering Stability on Snow)

A sensory evaluation was performed by a test driver on a test course constituted by a snowy road surface. Evaluation results were expressed as index values against a value of 100 for the conventional example. A larger index signifies a correspondingly superior steering stability on snow.

The tread patterns of the various test tires will now be described.
(Conventional Example)

Figure 7:
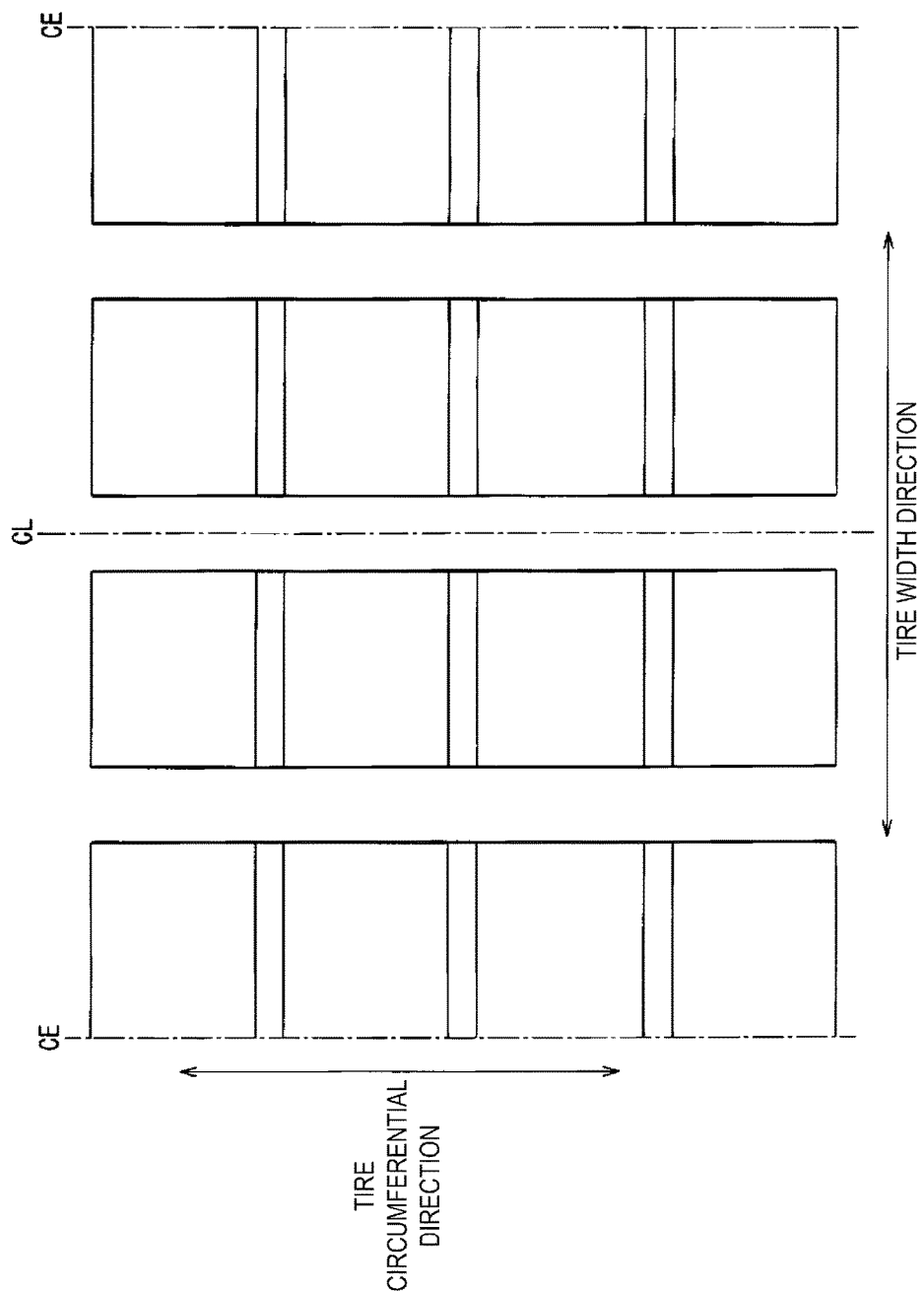
FIG. 7 is a flat development view of part of a tread portion of the pneumatic tire according to a conventional example.

As illustrated in FIG. 7, the pneumatic tire according to the conventional example had a tread pattern constituted by the tread pattern illustrated in FIG. 2 from which the circumferential narrow grooves 16 and the widthwise narrow grooves 18 have been removed.
(Working Example 3)

The pneumatic tire according to working example 1 had a tread pattern constituted by the tread pattern illustrated in FIG. 2 from which the circumferential main grooves 12 and the lug grooves 14 have been removed and in which circumferential narrow grooves 16 and widthwise narrow grooves 18 are provided.
(Working Example 2)

The pneumatic tire according to working example 2 had a rib pattern constituted by the tread pattern illustrated in FIG. 2 from which the lug grooves 14 have been removed and in which circumferential main grooves 12, circumferential narrow grooves 16, and widthwise narrow grooves 18 are provided.
(Working Examples 3 to 5)

The pneumatic tires according to working examples 3 through 5 had tread patterns based on the tread pattern illustrated in FIG. 2, in which the surface areas of the small blocks 20, the dimensions with respect to the tire width direction, and the dimensions with respect to the tire circumferential direction have been altered according to the values shown in table 1.
(Working Example 6)

The pneumatic tire according to working example 6 had a tread pattern based on the tread pattern illustrated in FIG. 2, in which the shape of the small blocks 20 was altered to the convex and concave shape illustrated in FIG. 6A.
(Working Example 7)

The tread pattern of working example 7 comprised small blocks 20 having an arrow fletch shape such as that illustrated in FIG. 5. The bend angle of the tips of the arrow fletch shapes of the small blocks 20 was 140°.

The tread patterns of these test tires are formed based on the tread patterns illustrated in the corresponding drawings. Accordingly, it should be noted that features such as the numbers of constituent small blocks 20 and small block rows 22 have been altered, as appropriate, from those illustrated in the various drawings according to the parameters set forth in table 1.

The test tires according to the conventional example and working example 1 through 7 were subjected to tire performance testing for braking performance on ice and steering stability on snow. Table 1 shows numerical values for the properties and dimensions of the tread patterns of the various test tires, and performance test results.

TABLE 1

| | Conventional Example | Working Example 1 | Working Example 2 | Working Example 3 |
|---|---|---|---|---|
| Tread pattern | FIG. 7 | FIG. 2 (Circumferential main grooves and lug | FIG. 2 (Lug grooves removed) | FIG. 2 |

TABLE 1-continued

|  |  |  | grooves removed) |  |  |
|---|---|---|---|---|---|
| Short small blocks | Surface area (mm²) |  | 190 | 155 | 155 |
|  | Tire width direction dimension IwA (mm) |  | 20 | 16 | 16 |
|  | Tire circumferential direction dimension IIA (mm) |  | 10 | 10 | 10 |
| Long small blocks | Surface area (mm²) |  | 380 | 300 | 300 |
|  | Tire width direction dimension IwA (mm) |  | 20 | 16 | 16 |
|  | Tire circumferential direction dimension IIA (mm) |  | 20 | 20 | 20 |
| Small block shape |  |  | — | Octagonal | Octagonal | Octagonal |
| Braking performance on ice |  |  | 100 | 105 | 105 | 105 |
| Steering stability on snow |  |  | 100 | 105 | 110 | 115 |

|  |  | Working Example 4 | Working Example 5 | Working Example 6 | Working Example 7 |
|---|---|---|---|---|---|
| Tread pattern |  | FIG. 2 | FIG. 2 | FIG. 6A (FIG. 2) | FIG. 5 |
| Short small blocks | Surface area (mm²) | 95 | 95 | 95 | 100 |
|  | Tire width direction dimension IwA (mm) | 10 | 10 | 10 | 10 |
|  | Tire circumferential direction dimension IIA (mm) | 10 | 10 | 10 | 10 |
| Long small blocks | Surface area (mm²) | 175 | 135 | 135 | 140 |
|  | Tire width direction dimension IwA (mm) | 10 | 10 | 10 | 10 |
|  | Tire circumferential direction dimension IIA (mm) | 18 | 14 | 14 | 14 |
| Small block shape | | Octagonal | Octagonal | Concave and convex | Arrow fletch |
| Braking performance on ice | | 108 | 110 | 120 | 130 |
| Steering stability on snow | | 130 | 130 | 130 | 130 |

The results shown in table 1 indicate that the pneumatic tires according to working examples 1 through 7, which fall within the technical scope of the present technology, exhibit improved braking performance on ice and steering stability on snow compared to the conventional pneumatic tire not falling within the technical scope of the present technology.

The present technology is defined as follows.

(1) A pneumatic tire in which a plurality of small blocks is delineated and formed by a plurality of rectilinear circumferential narrow grooves and a plurality of widthwise narrow grooves that communicate with the circumferential narrow grooves, and small block rows with the small blocks aligned along a tire circumferential direction are formed between adjacent circumferential narrow grooves, each of the small blocks has a surface area differing from that of at least one small block that belongs to an adjacent small block row on at least one side with respect to a tire width direction and has an overlapping tire circumferential directional region; and the surface area of each of the small blocks is no less than 20 mm² and no more than 400 mm².

(2) The pneumatic tire according to (1), wherein the tire is further provided with at least one circumferential main groove that is wider than the circumferential narrow grooves and a plurality of lug grooves that are wider than the widthwise narrow grooves, the lug grooves communicating with the circumferential grooves and/or ground contact edges.

(3) The pneumatic tire according to (2), wherein there are no less than two types of distance between adjacent lug grooves in the tire circumferential direction.

(4) The pneumatic tire according to any one of (1) to (3), wherein the small blocks have dimensions with respect to the tire width direction of no less than 5 mm and no more than 15 mm. (5) The pneumatic tire according to any one of (1) to (4), wherein the small blocks have dimensions with respect to the tire circumferential direction of no less than 5 mm and no more than 15 mm.

(6) The pneumatic tire according to any one of (1) to (5), wherein the small blocks have convex sections on one side thereof with respect to the tire circumferential direction that project toward the adjacent small blocks in the tire circumferential direction and concave sections on the other side thereof with respect to the tire circumferential direction that recess inward with respect to the adjacent small blocks in the tire circumferential direction, the convex sections and the concave sections of adjacent small blocks in the tire circumferential direction being fitted together via the widthwise narrow grooves.

(7) The pneumatic tire according to (6), wherein the small blocks have arrow fletch shapes, and tips of the arrow fletch shapes have bend angles of no less than 40° and no more than 170°.

What is claimed is:

1. A pneumatic tire comprising:
   a plurality of small blocks delineated and formed by a plurality of rectilinear circumferential narrow grooves and a plurality of widthwise narrow grooves that communicate with the circumferential narrow grooves; and
   small block rows with the small blocks aligned along a tire circumferential direction formed between adjacent circumferential narrow grooves, the small block rows and the circumferential narrow grooves being between adjacent circumferential main grooves;
   each of the small blocks of each of the small block rows having a surface area differing from that of at least one small block that belongs to an adjacent small block row on at least one side with respect to a tire width direction and has an overlapping tire circumferential directional region in which each of the small blocks of one small block row overlap, in the tire circumferential direction, with at least one small block that belongs to the adjacent small block row; and
   the surface area of each of the small blocks being no less than 20 mm² and no more than 250 mm².

2. The pneumatic tire according to claim 1, further comprising:
   the circumferential main grooves, at least one of the circumferential main grooves being wider than the circumferential narrow grooves; and a plurality of lug grooves that are wider than the widthwise narrow grooves, wherein
the lug grooves communicate with the at least one of the circumferential main grooves and/or ground contact edges.

3. The pneumatic tire according to claim 2, wherein there are no less than two types of distance between adjacent lug grooves in the tire circumferential direction.

4. The pneumatic tire according to claim 3, wherein the small blocks have dimensions with respect to the tire width direction of no less than 5 mm and no more than 15 mm.

5. The pneumatic tire according to claim 4, wherein the small blocks have dimensions with respect to the tire circumferential direction of no less than 5 mm and no more than 15 mm.

6. The pneumatic tire according to claim 5, wherein the small blocks have convex sections on one side thereof with respect to the tire circumferential direction that project toward the adjacent small blocks in the tire circumferential direction and concave sections on the other side thereof with respect to the tire circumferential direction that recess inward with respect to the adjacent small blocks in the tire circumferential direction, the convex sections and the concave sections of adjacent small blocks in the tire circumferential direction being fitted together via the widthwise narrow grooves.

7. The pneumatic tire according to claim 6, wherein the small blocks have arrow fletch shapes, and tips of the arrow fletch shapes have bend angles of no less than 40° and no more than 170°.

8. The pneumatic tire according to claim 2, wherein the small blocks have dimensions with respect to the tire width direction of no less than 5 mm and no more than 15 mm.

9. The pneumatic tire according to claim 8, wherein the small blocks have dimensions with respect to the tire circumferential direction of no less than 5 mm and no more than 15 mm.

10. The pneumatic tire according to claim 9, wherein the small blocks have convex sections on one side thereof with respect to the tire circumferential direction that project toward the adjacent small blocks in the tire circumferential direction and concave sections on the other side thereof with respect to the tire circumferential direction that recess inward with respect to the adjacent small blocks in the tire circumferential direction, the convex sections and the concave sections of adjacent small blocks in the tire circumferential direction being fitted together via the widthwise narrow grooves.

11. The pneumatic tire according to claim 10, wherein the small blocks have arrow fletch shapes, and tips of the arrow fletch shapes have bend angles of no less than 40° and no more than 170°.

12. The pneumatic tire according to claim 1, wherein the small blocks have dimensions with respect to the tire width direction of no less than 5 mm and no more than 15 mm.

13. The pneumatic tire according to claim 1, wherein the small blocks have dimensions with respect to the tire circumferential direction of no less than 5 mm and no more than 15 mm.

14. The pneumatic tire according to claim 1, wherein the small blocks have convex sections on one side thereof with respect to the tire circumferential direction that project toward the adjacent small blocks in the tire circumferential direction and concave sections on the other side thereof with respect to the tire circumferential direction that recess inward with respect to the adjacent small blocks in the tire circumferential direction, the convex sections and the concave sections of adjacent small blocks in the tire circumferential direction being fitted together via the widthwise narrow grooves.

15. The pneumatic tire according to claim 14, wherein the small blocks have arrow fletch shapes, and tips of the arrow fletch shapes have bend angles of no less than 40° and no more than 170°.

* * * * *